US010121281B2

(12) United States Patent
Matjasko et al.

(10) Patent No.: US 10,121,281 B2
(45) Date of Patent: *Nov. 6, 2018

(54) SYSTEM AND METHOD FOR VISUALIZING AN OBJECT IN A SIMULATED ENVIRONMENT

(71) Applicant: Vitro S.A.B. de C.V., Nuevo Leon (MX)

(72) Inventors: Kevin J. Matjasko, Freeport, PA (US); Frank J. Triggiani, Pittsburgh, PA (US); Srinivasa G. Narasimhan, McDonald, PA (US)

(73) Assignee: Vitro, S.A.B. de C.V., Nuevo Leon (MX)

( * ) Notice: Subject to any disclaimer, the term of this patent is extended or adjusted under 35 U.S.C. 154(b) by 546 days.

This patent is subject to a terminal disclaimer.

(21) Appl. No.: 14/725,599

(22) Filed: May 29, 2015

(65) Prior Publication Data

US 2016/0140754 A1  May 19, 2016

Related U.S. Application Data

(63) Continuation of application No. 13/572,065, filed on Aug. 10, 2012, now Pat. No. 9,076,247.

(51) Int. Cl.
| G06G 7/48 | (2006.01) |
| G06T 15/50 | (2011.01) |
| G06T 15/00 | (2011.01) |
| G06T 15/20 | (2011.01) |
| G06T 19/20 | (2011.01) |
| G06F 3/0481 | (2013.01) |
| G06T 19/00 | (2011.01) |

(52) U.S. Cl.
CPC ........ *G06T 15/506* (2013.01); *G06F 3/04815* (2013.01); *G06T 15/00* (2013.01); *G06T 15/20* (2013.01); *G06T 19/006* (2013.01); *G06T 19/20* (2013.01); *G06T 2219/2024* (2013.01)

(58) Field of Classification Search
CPC .................................................. G06T 15/506
USPC .......................................................... 703/6
See application file for complete search history.

(56) References Cited

U.S. PATENT DOCUMENTS

| 7,783,525 B2 * | 8/2010 | Hathaway | .......... G06Q 30/0282 705/26.1 |
| 2010/0030578 A1 * | 2/2010 | Siddique | ............ G06Q 10/0637 705/3 |

* cited by examiner

*Primary Examiner* — Hugh Jones
(74) *Attorney, Agent, or Firm* — Andrew C. Siminerio

(57) ABSTRACT

A computer-implemented method for visualizing an object includes the steps of providing a simulated environment; rendering, with at least one processor, at least one virtual object based at least partially on the simulated environment, a viewable angle of the at least one virtual object, and object characteristics associated with the at least one virtual object, the object characteristics comprising at least one of the following: reflectance, transmittance, attenuation, or any combination thereof; and changing a viewable angle of the at least one virtual object in response to user input. A system and a computer program product for implementing the aforementioned method includes appropriately communicatively connected hardware components.

19 Claims, 17 Drawing Sheets

| Angle | LBNL Tvis | Visualizer Tvis | LBNL RFVis | Visualizer RFVis | LBNL RBVis | Visualizer RBVis |
|---|---|---|---|---|---|---|
| 0 | 0.79 | 0.8211 | 0.059 | 0.059 | 0.049 | 0.049 |
| 10 | 0.796 | 0.8269 | 0.051 | 0.059 | 0.042 | 0.049 |
| 20 | 0.785 | 0.8279 | 0.049 | 0.059 | 0.04 | 0.049 |
| 30 | 0.773 | 0.8242 | 0.052 | 0.0591 | 0.043 | 0.0491 |
| 40 | 0.758 | 0.813 | 0.063 | 0.0604 | 0.054 | 0.0504 |
| 50 | 0.732 | 0.7955 | 0.081 | 0.0682 | 0.072 | 0.0583 |
| 60 | 0.671 | 0.7632 | 0.116 | 0.1005 | 0.107 | 0.091 |
| 70 | 0.547 | 0.6824 | 0.207 | 0.2021 | 0.199 | 0.1936 |
| 80 | 0.329 | 0.4726 | 0.449 | 0.4579 | 0.444 | 0.4521 |
| 90 | 0 | 0.0008 | 0.999 | 1 | 0.999 | 1 |

SYSTEM AND METHOD FOR VISUALIZING AN OBJECT IN A SIMULATED ENVIRONMENT

CROSS REFERENCE TO RELATED APPLICATIONS

This application is a continuation of U.S. patent application Ser. No. 13/572,065 filed Aug. 10, 2012, the disclosure of which is incorporated by reference in its entirety.

BACKGROUND OF THE INVENTION

Field of the Invention

The present invention relates generally to the visualization of objects and, more specifically, to systems, methods and computer program products for visualizing virtual objects in a simulated environment.

Description of Related Art

Typically, consumers view products online prior to purchasing them, relying on a visual representation of the product shown on a website as accurately portraying the physical product being purchased. However, unlike being in an actual retail environment, viewing an object online does not allow a user to see how the product looks in different lighting and/or environmental conditions.

This problem especially applies to coatings, paints, glass, building materials, and other like products for which optical properties are often complex and visual appearance is important. Consumers are unable to accurately rely on a website portrayal for details such as, for example, the reflectance, transmittance, and color of an object. Moreover, the lighting conditions for website images are unknown. One does not know if they are viewing the product as photographed under fluorescent, incandescent, or natural lighting conditions.

Thus, suppliers and manufacturers of certain products usually make samples and swatches available to their customers to provide a way to accurately view the product. This way, customers can view the sample in different lighting conditions and environments to make an informed purchasing decision. However, supplying all potential customers with physical samples is costly and difficult, and often requires sending several different samples so that the customers have a catalog to choose from.

Current approaches to providing accurate visualizations of products through websites are image-driven, enabling users to view various images in a number of ways. In these systems, environmental conditions are those that existed when the photographs were taken. A change in lighting condition would require a new set of images, and each angle of visibility would require a separate image. Such image-based methods are limited when the properties and types of materials and/or products vary, and where there is a need to visualize the product in various conditions. Further, an image-based approach limits options to customize and combine materials, since the visualizations are predetermined and not uniquely rendered.

Thus, there is a need to provide visualizations of objects in simulated environmental conditions.

SUMMARY OF THE INVENTION

It is, therefore, an object of the present invention to address some or all of the deficiencies in the prior art.

According to one preferred and non-limiting embodiment, provided is a computer-implemented method for visualizing an object, including: providing a simulated environment; rendering, with at least one processor, at least one virtual object based at least partially on the simulated environment, a viewable angle of the at least one virtual object, and object characteristics associated with the at least one virtual object, the object characteristics comprising at least one of the following: reflectance, transmittance, attenuation, or any combination thereof; and changing a viewable angle of the at least one virtual object in response to user input.

According to another preferred and non-limiting embodiment, provided is a system for generating a virtual object in a simulated environment, including at least one computer system including at least one processor configured to: generate a user interface comprising a simulated environment; render the virtual object in the simulated environment based at least partially on optical properties of the virtual object, a viewable angle of the virtual object, and the simulated environment; and modify, based at least partially on user input, at least one of the following the viewable angle of the virtual object, the object characteristics, the simulated environment, or any combination thereof.

According to another preferred and non-limiting embodiment, provided is a computer-implemented method for displaying a glass object in a simulated environment, the method including: receiving a selection from a user, the selection comprising at least one object characteristic; displaying a simulated environment; rendering a virtual glass object in the simulated environment based at least partially on object characteristics associated with the selection, a viewable angle of the virtual glass object and the simulated environment; and modifying the viewing angle of the virtual glass object based at least partially on user input.

According to a further preferred and non-limiting embodiment, provided is a computer program product for displaying a glass object in a simulated environment, the computer program product including at least one non-transitory computer-readable medium including instructions which, when executed by at least one processor, cause the at least one processor to: receive a selection from a user, the selection comprising at least one object characteristic; display a simulated environment; render a virtual glass object in the simulated environment based at least partially on object characteristics associated with the selection, a viewable angle of the virtual glass object, and the simulated environment; and modify the viewing angle of the virtual glass object based at least partially on user input.

DESCRIPTION OF THE PREFERRED EMBODIMENTS

Figure 1A:
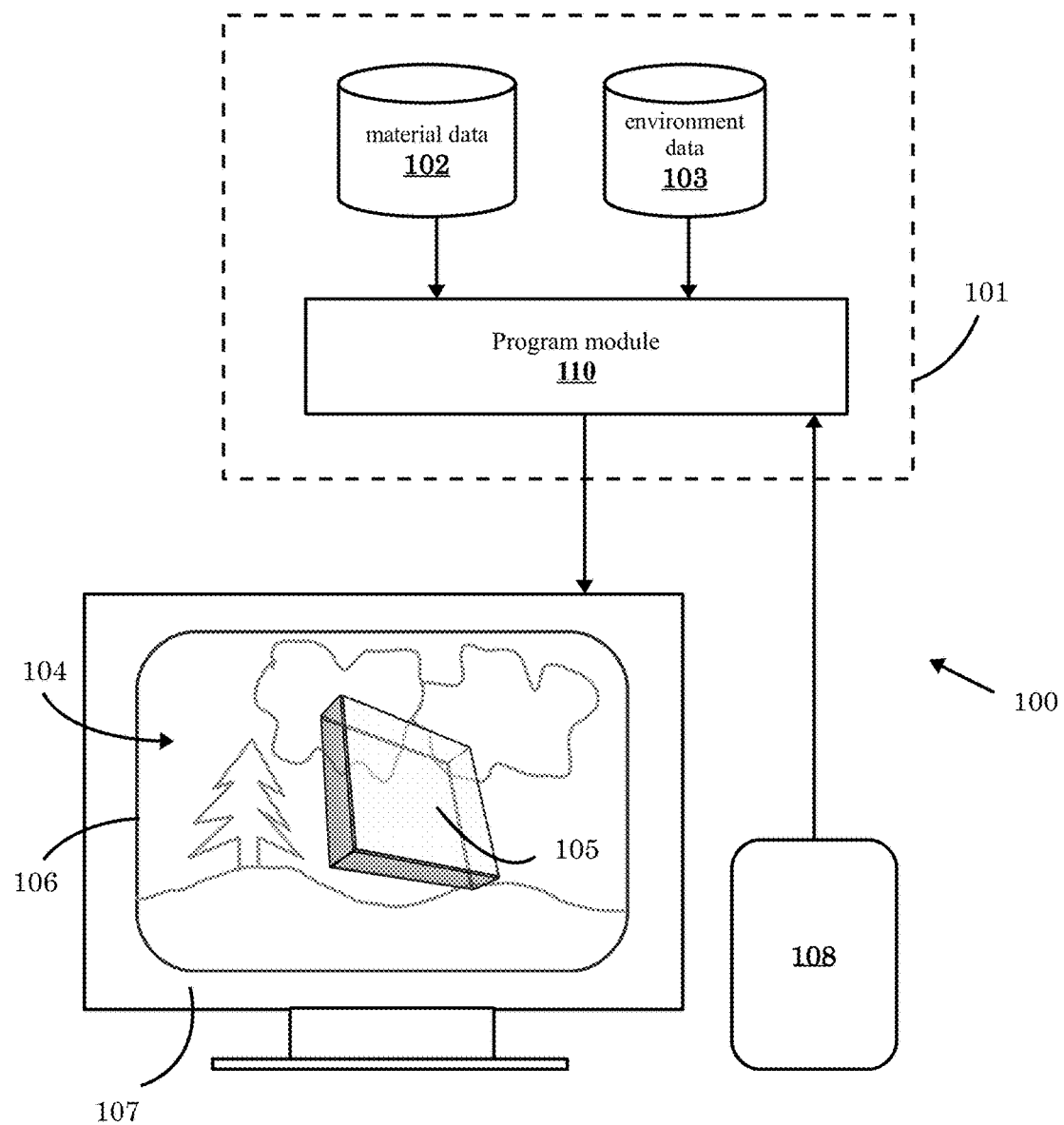
FIG. 1a is a schematic view of one embodiment of a system for visualizing an object in a simulated environment according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

Referring to FIG. 1a, shown is a system 100 for visualizing a virtual object 105 in a simulated environment 104 according to one preferred and non-limiting embodiment of the present invention. A computer system 101 includes a program module 110, an object database 102, and an environment database 103. The computer system 101 is in communication with a display device 107 and an input device 108. The simulation module 110 is configured to display, on the display device 107, a graphical user interface (GUI) 106 that includes a simulated environment 104. Within the simulated environment 104, a virtual object 105 is displayed according to one or more conditions associated with the simulated environment 104, using data from the object database 102 and/or the environment database 103. The virtual object 105 may be an object comprising a material, such as a pane of coated or uncoated glass. However, it will be appreciated that the virtual object 105 may take on any number of forms.

The computer system 101 may include a single computer, a server computer, a combination of computers, or any other combination of hardware and/or software components. The components may be localized or, in some embodiments, distributed among any number of devices, local or remote. For example, in a preferred and non-limiting embodiment, the computer system 101 may include one or more server computers accessible via the internet that perform most of the data processing and delivery processes, and provide data to a remote terminal. In another preferred and non-limiting embodiment, one or more server computers perform some of the processing and/or delivery processes, but other processes are performed by a remote terminal. In other embodiments, a terminal may include the entirety of the computer system 101 and may be local to the display device 107 and input device 108. It will be appreciated that various other arrangements are possible.

The terms "virtual object" and "virtual objects", as used herein, refer to one or more objects of any shape, size, or type. As an example, a virtual object may be a visual representation of a glass pane, a building, a surface or surface area, or any other item. It will be appreciated that a virtual object may be any visual representation of one or more items and/or surfaces. The visual representation of the virtual object may be displayed on a display device 107 and have a three-dimensional or two-dimensional appearance. In a preferred and non-limiting embodiment, the virtual object is a glass pane or other glass-like building material. In another embodiment, the virtual object may be a building or part of a building having a glass or glass-like exterior. In one preferred and non-limiting embodiment, virtual objects are associated with one or more physical properties which may be related to matter that a virtual object comprises, a type of the virtual object, and/or a coating on the virtual object. Additionally, a virtual object may be imported into the system. For example, computer graphics, images, video, scans, or other types of media may be imported and converted into virtual objects.

As used herein, the terms "object characteristic" and "object characteristics" refer to one or more characteristics that may be associated with a virtual object. Object characteristics may include an object type (e.g., glass type, coating type, etc.), object properties (e.g., reflectance, transmittance, color, etc.), an object size or mass, an object composition (e.g., material), an object shape, or any other characteristics. For example, glass characteristics may include glass type (e.g., various types of glass, such as uncoated tinted glass, Azuria, Solarbronze, etc.), glass properties (e.g., solar heat range, color, reflectance, transmittance, etc.), glass size (e.g., thickness), glass composition, etc. Likewise, coating characteristics may include coating types, coating properties, coating composition, etc.

As used herein, the terms "object property" and "object properties" refer to one or more physical properties of any type of physical matter, such as a solid, liquid, and/or gas. These properties may include, for example, optical properties such as reflectance, transmittance, attenuation/absorption, refraction and/or color/tint. Different types of matter may have various optical properties represented by attenuation, reflectance, and transmittance coefficients, as examples. Optical properties relating to colors may be represented by, for example, various color spaces/models (e.g., RGB, CMYK, L*a*b*, etc). In addition to optical properties, the physical properties may also include other physical properties that affect a visual appearance of the object or material, and may influence the optical properties, such as shape, thickness, texture, etc. The object properties may also include properties such as, for example, solar heat gain coefficients (SHGC), U-values (e.g., heat transfer coefficients), gas types (for objects comprising a gas-filled cavity, for example), and other material-specific properties.

As referenced herein, the term "database" refers to one or more data structures, data sources, and/or other types of data that may include, for example, data relating to properties of one or more virtual objects, coatings, and other physical matter, and/or one or more environments. The data structures may be independent of each other, or may be included in the same overall data set. For example, in a preferred and non-limiting embodiment, the object database and environment database are both stored on one or more storage devices in communication with a server computer. It will be appreciated that the data may be in any arrangement. The object and environment databases may be the same database, or may be physically and/or logically separate. The databases may be structured in any way, such as a table, text file, structured database, etc. In one preferred and non-limiting embodiment of the present invention, the databases are in the form of Extensible Markup Language (XML).

The object database 102 may include one or more databases that store object data representing object characteristics such as, for example, optical and/or other physical properties of an object. The object characteristics may be associated with the composition of a virtual object or a coating, as examples. The object data for a given virtual object may have values associated with a front surface and back surface of the object. Differences in front and back surfaces of an object may be caused by coatings or other materials that produce unidirectional effects such as reflectance, transmittance, attenuation, and/or differences in color. The object data may also include object characteristics associated with different lighting or other environmental conditions, such as location and/or angle of incidence of the light source with respect to an object, a wavelength and/or frequency of the light, an intensity of the light, etc. In the object database 102, object types (e.g., glass type, coating type, etc.) may be associated with one or more object characteristics.

In one preferred and non-limiting embodiment of the present invention, the object database 102 comprises an external data resource, such as that maintained by the Lawrence Berkeley National Laboratory (LBL). The LBL maintains databases for associating optical properties with different types of glass products, coatings, and other materials. Various entities provide this data to the LBL for different products, and the LBL stores and maintains this data for public access. Thus, the LBL may be accessed to retrieve reflectance, transmittance, and color information for a specific type of glass (e.g., Caribia), at different viewing angles. The data from the LBL, or other object database 102, may be used to calculate attenuation coefficients and/or refractive indexes for different objects.

Likewise, the environment database 103 may include any database or data source that stores environment data representing physical properties associated with an environment to be simulated. This data may include, for example, media items such as images, videos, panoramic (including spherical panoramic) images, etc., lighting information associated with weather conditions, various forms of cloud cover, sunlight, geographic regions, and other factors. The environment data may also include data relating to other types of information such as temperature, non-visible light, sun position (e.g., time of day), artificial light conditions, etc. Images may be associated with various luminosities, representing a simulated lighting condition of the environment. Luminosities may be determined from the image in real-time as the virtual object is rendered in the simulated environment, or may be predetermined and associated with various images in the environment database 103. Environment data may be provided to a user or imported by a user, as examples.

Figure 1B:
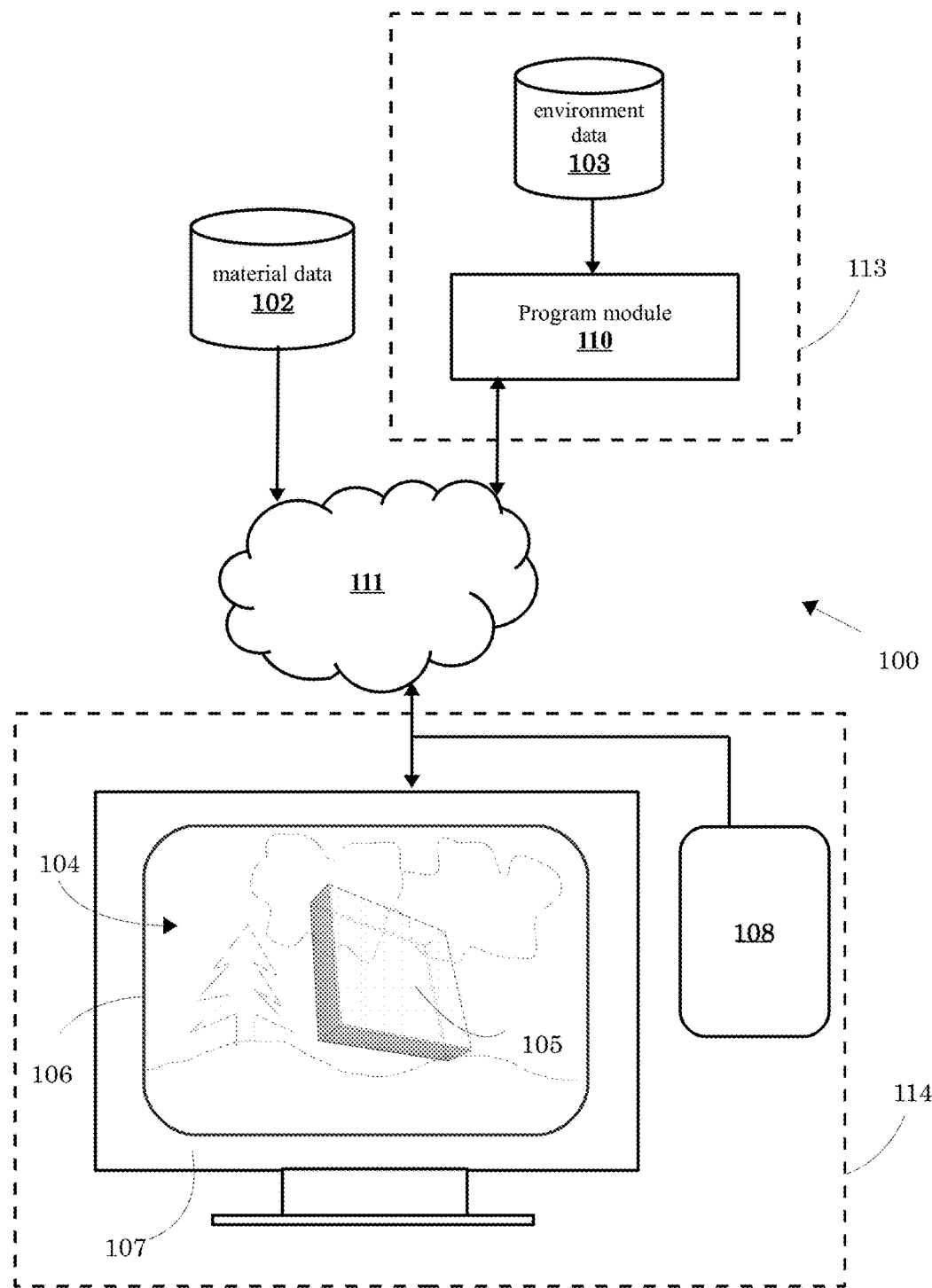
FIG. 1b is a schematic view of another embodiment of a system for visualizing an object in a simulated environment according to the principles of the present invention.

With reference to FIG. 1b, illustrated is a system 100 for visualizing a virtual object 105 in a simulated environment 104 according to one preferred and non-limiting embodiment of the present invention. A program module 110 in a server computer system 113 is in communication with an environment database 102 and a network environment 111, such as the internet. An object database 102 and user terminal 114 are also in communication with the network environment 111. In the illustrated example, the environment database 103 is local to the server computer system 113 and the object database 102 is external. However, it will be appreciated that various other arrangements are possible. The server computer system 113 may include, for example, a web server configured to serve web content.

The user terminal 114 may include a display device 107 and an input device 108. The server computer system 113 serves the user terminal 114 with web content that is in the form of a GUI accessible through a web browser or software application. The program module 110 may retrieve object data from the object database 102 in response to user input, through the input device 108, specifying, for example, an object type that is associated with one or more properties. The GUI 106 displays a simulated environment 104 on the display device 107, including a virtual object 105. The virtual object 105 is rendered from environment data, obtained from the environment database 103, and object data, obtained from the object database 102. As described herein, the rendering may also take into account other parameters, such as a viewing angle of the virtual object 105, an angle of the virtual object 105 with respect to a lighting condition in the simulated environment 104, and other factors and/or considerations.

The program module 110 may include program instructions that cause a computer to receive user input indicating a selection of one or more objects from a list of objects. The object selected can be associated with object characteristics, including various physical properties. The program instructions may further cause the computer to identify object data that indicate one or more properties of the selected object. After having identified the object data, the program instructions render a virtual object 105 comprising the object characteristics in a simulated environment 104.

The virtual object 105 may be rendered with one or more algorithms. In one preferred and non-limiting embodiment, Fresnel equations are used to calculate the behavior of light through a virtual object. The algorithms may take, as input, object characteristics such as reflectance, transmittance, and attenuation coefficients, refractive index, viewing angle, angle of lighting conditions with respect to the virtual object, and other considerations. For three-dimensional virtual objects, or for multiple glass panes, the algorithms may consider interferences between multiple light waves. It will be appreciated that the rendering may also be performed by using directly measured angular reflectance and transmittance data. For example, measured angular reflectance and transmittance data for various types of glass, coatings, and other materials can be stored in a database and interpolated for all viewing angles. Additionally, attenuation coefficients and/or refractive indexes allow for the rendering of the virtual object 105 to account for different thicknesses.

In one preferred and non-limiting embodiment, the virtual object 105 is rendered as a vector graphic using compilers and libraries such as, for example, Visual Studio C++, including C++ libraries, MATLAB, DirectX, High Level Shading Language (HLSL) shader libraries, and other libraries for high dynamic range environment rendering. For rendering the virtual object 105 in a web browser, WebGL can be used in conjunction with various libraries such as THREE.js, provided by Google. However, it will be appreciated that any number of different software development environments, compilers, and libraries can be used, and that the virtual object 105 may be rendered as any type of graphic, including a raster or vector graphic.

Figure 2A:
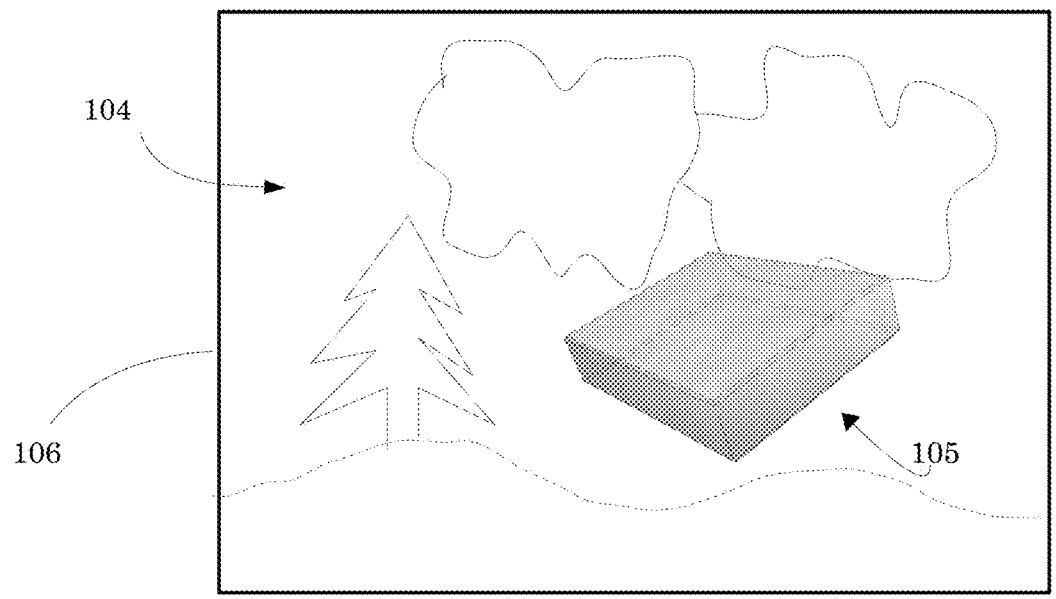
FIGS. 2a-2b illustrate views of graphical user interfaces of a system for visualizing an object in a simulated environment according to the principles of the present invention.
Figure 2B:
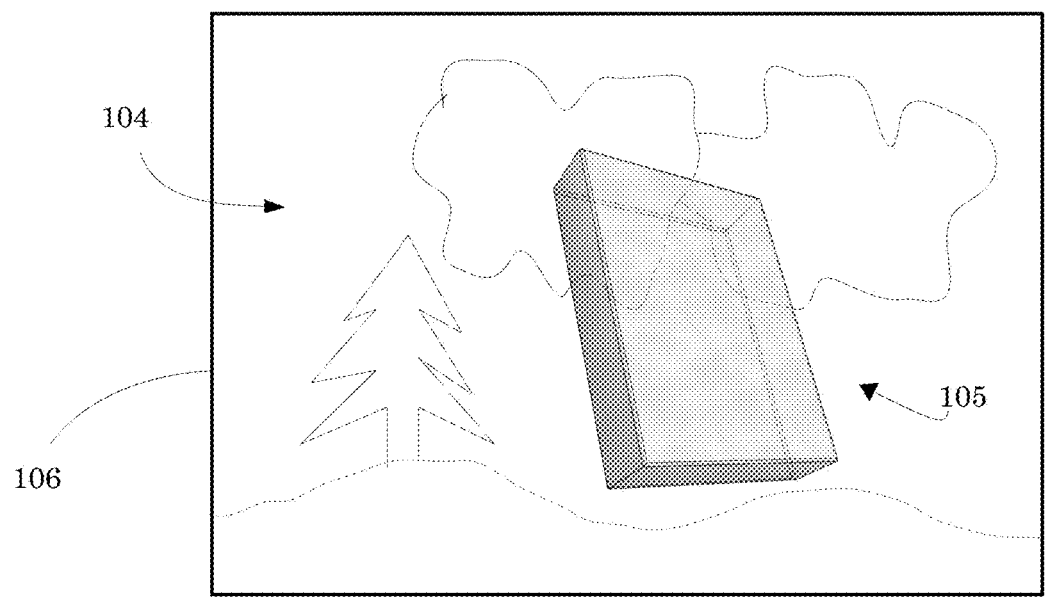

With reference to FIGS. 2a, 2b, 3a, and 3b, shown are GUIs according to one preferred and non-limiting embodiment of the present invention. In FIGS. 2a and 2b, a virtual object 105 coated in a material is shown at two different viewing angles. Although the virtual object 105 displayed in both FIGS. 2a and 2b are the same, the different angles of the virtual objects 105 with respect to a simulated lighting condition and/or a viewing angle produce different effects. In FIGS. 2a and 2b, the lighting condition is a simulated light source that is approximately in the upper right of the pictured simulated environment 104, as evidenced by the difference in lightness/color and reflectance of the visualizations shown in both illustrations.

Figure 3A:
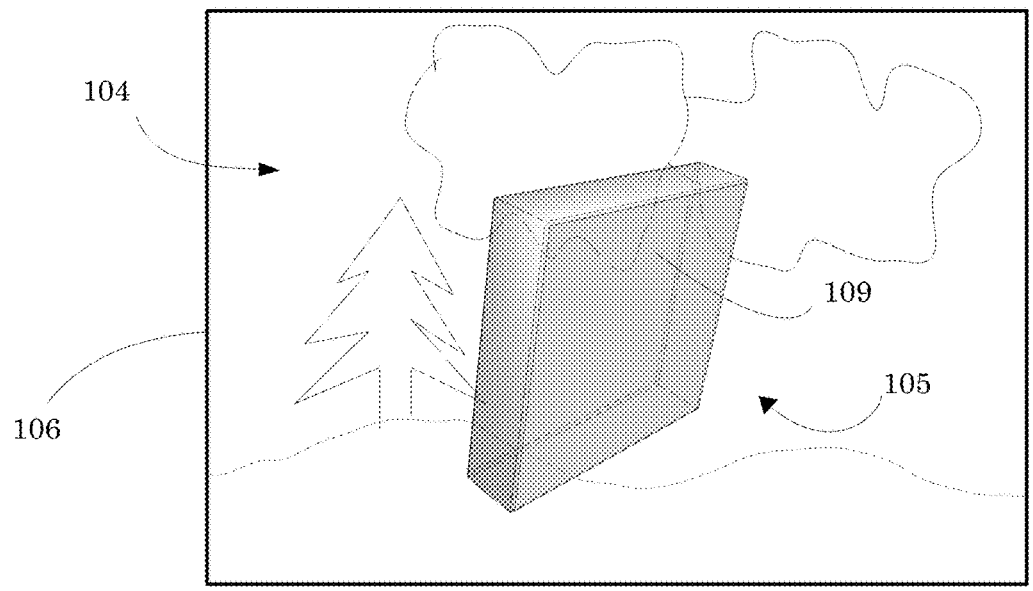
FIGS. 3a-3b illustrate further views of graphical user interfaces of a system for visualizing an object in a simulated environment according to the principles of the present invention.
Figure 3B:
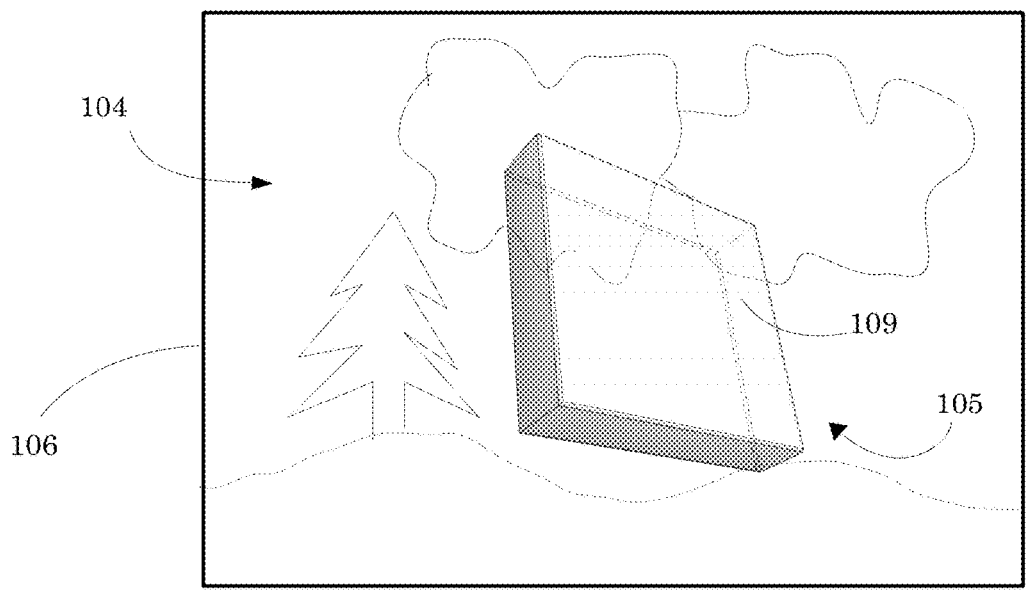

Similarly with reference to FIGS. 3a and 3b, the virtual object 105 displayed in FIG. 3a has a front-facing side 109 that is darker than the front-facing side 109 of FIG. 3b because the virtual object 105 is situated at an angle such that the simulated light source is not directly exposed to it. In contrast, the front-facing side 109 of FIG. 3b is reflecting the simulated light source and therefore appears to be lighter. As a user manipulates the virtual objects 105, the rendering may be updated in real-time (or substantially in real-time) so as to realistically and fluidly display the virtual object in simulated environmental conditions.

Figure 4:
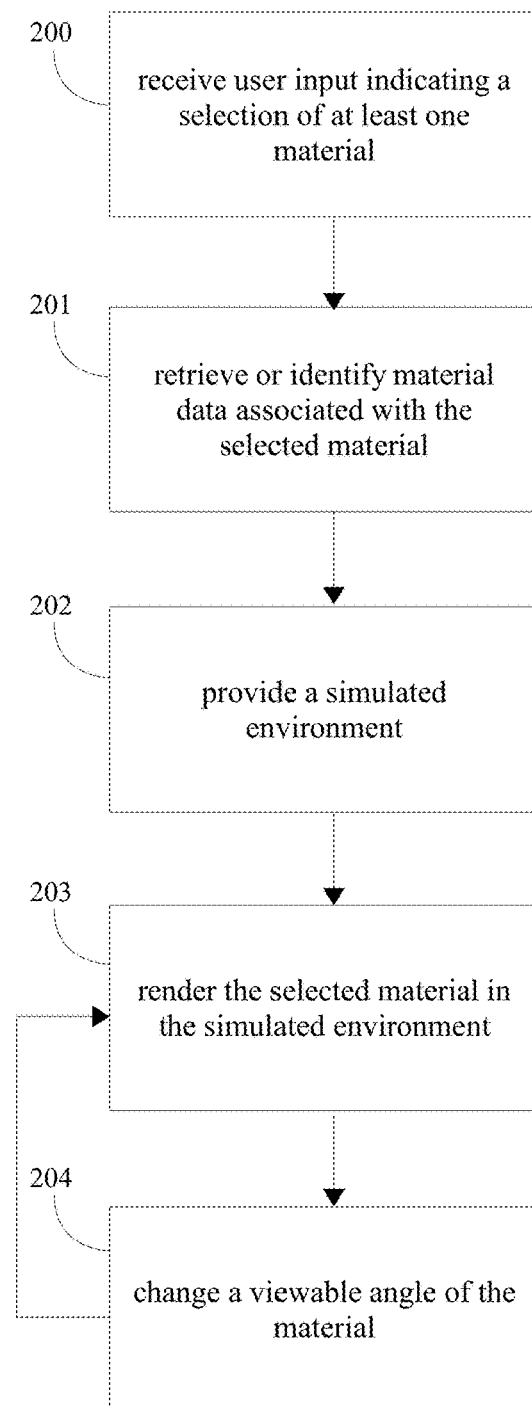
FIG. 4 is a flow diagram of one embodiment of a method for visualizing an object in a simulated environment according to the principles of the present invention.

Referring now to FIG. 4, a method for visualizing an object in a simulated environment is illustrated according to one preferred and non-limiting embodiment of the present invention. Starting at step 200, user input is received indicating a selection of at least one object. This object may be, for example, a type of glass product or a coating for a glass product. Other parameters may be selected as well, such as but not limited to an object type and/or composition, an environment, and/or various properties of the environment such as lighting condition, intensity, location of light source, etc. It will be appreciated that the selections may be made by a user through a GUI with various selectable options (e.g., radio buttons, drop-down boxes, input boxes, check boxes, slide bars, etc.) and that, in other embodiments, the selections may occur at any time. For example, the selections may be made by a user initially, prior to rendering the virtual object, or the selections may be input after the virtual object is displayed. In yet another example, these parameters may be preset or based on other conditions or input.

At step 201, the system 100 retrieves or identifies object data associated with the selected object. As explained herein, object data may be retrieved from a local or remote data source, such as an object database, or a combination of data sources. Object data may represent a variety of object characteristics, as discussed above, such as the physical properties of an object, including a reflectance, transmittance, color, and/or other properties.

Next, at step 202, the system 100 provides a simulated environment. As described herein, the simulated environment may include an image, series of images, spherical panoramas, lighting conditions, weather conditions, etc. In one example, a simulated environment may have a lighting condition associated with an angle or location of a simulated light source. The simulated environment may be provided to a user terminal, and displayed on a display device. In a preferred and non-limiting embodiment, the simulated environment may include at least a portion of a spherical panoramic image. The spherical panoramic image may be, for example, a high dynamic range spherical panorama. In one non-limiting embodiment, the simulated environment may be provided through a web interface. A high dynamic range image can be displayed on a standard low dynamic range (e.g., 8 bit) display through the use of blooming.

At step 203, the system 100 renders the selected object in the simulated environment as a virtual object 105. As described herein, the rendering of the selected object may take into account the simulated environment, the object data, the environment data, an initial angle of the virtual object, and/or other data, parameters, and considerations. The processing required to render the object may be performed on a user terminal, server computer, or any combination of processors and devices. Although the virtual object is rendered based at least partially on object data, the virtual object may also be rendered based on the environment data and other parameters.

As a next step 204, a viewable angle of the virtual object is changed in response to user input. The viewable angle may be changed with respect to the display and with respect to the virtual object. For example, the viewable angle of the virtual object may be changed by rotating the environment with respect to the virtual object, by rotating the virtual object with respect to the environment, or by any other method. When a user initiates a change in a viewable angle of the object, the method may then go to step 203 in order to render the object again, taking into consideration the new viewing angle.

In one preferred and non-limiting embodiment, the rendered object can be moved (e.g., rotated, displaced, etc.), or the environment perspective changed. Thus, the viewing angle of the virtual object is modified, allowing a user to see how the selected virtual object appears at a different angle with respect to a lighting condition and/or a user perspective. The virtual object may be re-rendered as the product is moved, or as the environment perspective changes, to account for the new viewing angle. As an example, a user may manipulate the virtual object with a mouse, keyboard, touchscreen, or other form of user input. Additionally, the lighting condition may be changed or moved by a user, also resulting in the virtual object being re-rendered to account for this change.

Figure 5:
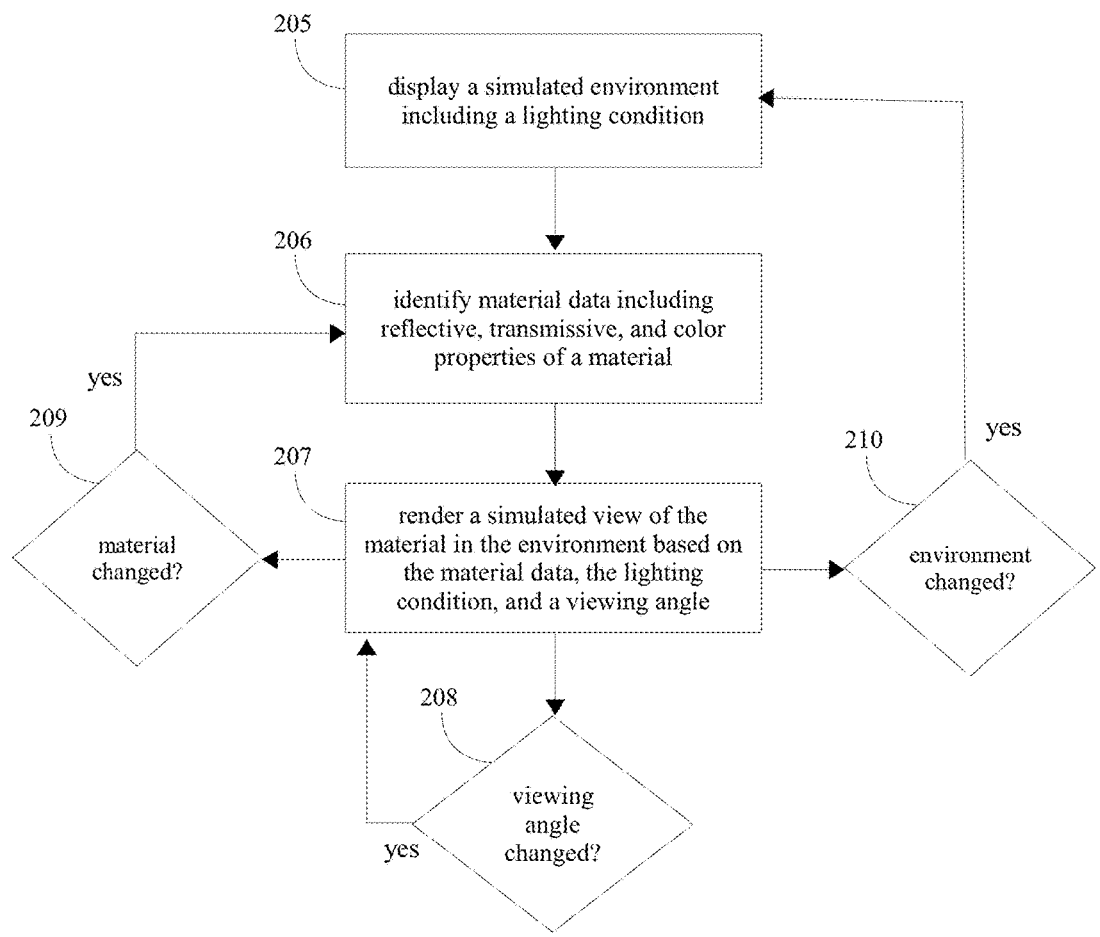
FIG. 5 is a flow diagram of another embodiment of a method for visualizing an object in a simulated environment according to the principles of the present invention.

Referring now to FIG. 5, a method for visualizing an object in a simulated environment is illustrated according to one preferred and non-limiting embodiment of the present invention. At a first step 205, a simulated environment is displayed, including a lighting condition. At a second step 206, object data is identified, including the reflectance, transmittance, and color properties of an object. As a third step 207, a simulated view of the virtual object is rendered in the simulated environment based on the object data, the lighting condition, and a viewing angle. The next steps 208, 209, and 210 check to see if any conditions have been changed. At step 208, a determination is made whether a viewing angle of the virtual object has changed. If it has, the method proceeds back to step 207 to re-render a simulated view of the virtual object. At step 209, a determination is made whether the virtual object has changed. If it has, the method proceeds back to step 206 to identify object data for the new virtual object, and then to step 207 to re-render the virtual object. At step 210, a determination is made whether an environment has changed. If it has, the method proceeds to step 205 to display and simulate the new environment, and then to step 206 to identify object data if necessary, and then to step 207 to re-render the virtual object in the new environment.

Figure 6:
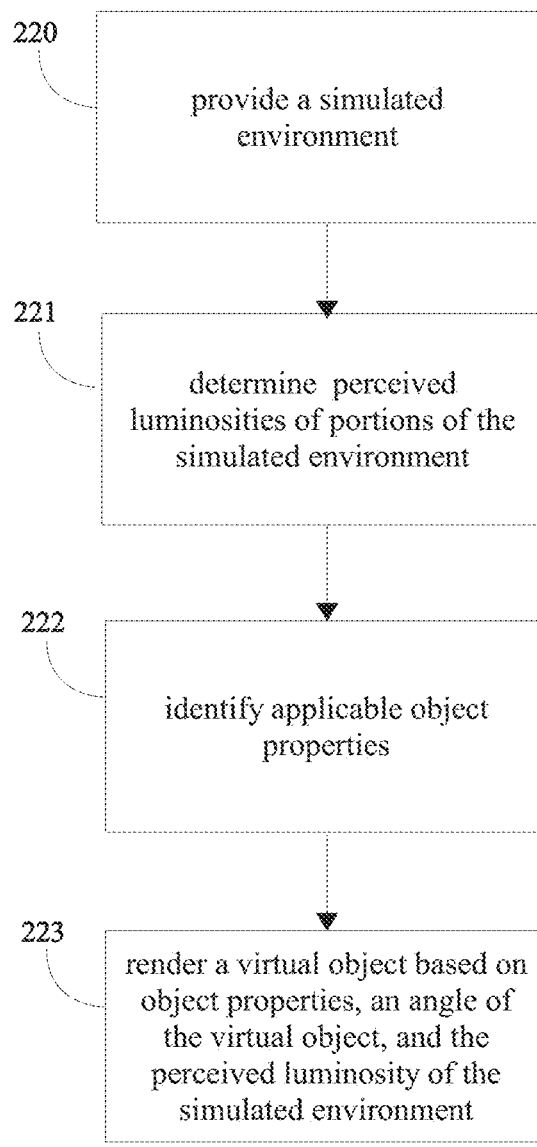
FIG. 6 is a flow diagram of another embodiment of a method for visualizing an object in a simulated environment according to the principles of the present invention.

With reference to FIG. 6, a method for visualizing an object in a simulated environment is illustrated according to one preferred and non-limiting embodiment. As a first step 220, a simulated environment is provided that may include, for example, one or more images or a spherical panoramic image. At a second step 221, perceived luminosities of different portions of the simulated environment are determined as lighting conditions. At a third step 222, object characteristics are identified for the virtual object to be rendered. At the last step 223, the virtual object is rendered based on object characteristics, an angle of the virtual object, and the determined luminosity of the simulated environment.

For example, in an outdoor simulated environment, the virtual object may reflect, based on one or more reflective properties of the virtual object and parameters of a lighting condition associated with that environment, a sky that includes clouds when a surface of the virtual object is substantially parallel to the ground (e.g., x and y-rotational axis substantially equal to zero). If the object data indicates that the virtual object is highly reflective, the reflected sky and clouds may be predominantly visible over the ground that is visible directly through the virtual object. This may range from a complete reflectiveness, with a virtual object having mirror-like properties, to no reflectiveness, with a virtual object that is intended to minimize reflection. In this example, a perceived luminosity may be stronger from the sky area of the environment than from elsewhere in the environment. This luminosity may influence how the virtual object is rendered.

As another example, in the outdoor simulated environment, the visualization may include a glare associated with the lighting condition. In an actual environment, glare occurs when an angle of the surface of the product with respect to a viewing perspective and a light condition, object type, and/or other parameters, causes an increased ratio of luminosity between the object and the light source. This effect may be simulated by the system. Additionally, the system may simulate a "bloom" effect, as is known in computer graphics, to simulate a photograph or video captured on film. A bloom effect may blur and/or envelope the edges of the virtual object with light and will be described further herein.

For example, in one preferred and non-limiting embodiment, object data representative of a "L*a*b*" color space (e.g., CIE-L*ab) may be converted to RGB or CMYK color schemes. L*a*b* color takes into account human perception and can adjust to simulated lighting conditions. Additionally, the L*a*b* color scheme includes all perceivable colors, ranging beyond the capabilities of the RGB color scheme. The L-dimension of L*a*b* coordinates relates to a lightness, and the "a" and "b" dimensions relate to color. The L*a*b* color space includes all of the possible colors of RGB and CMYK color schemes, in addition to many more permutations. A color representation in L*a*b* may be converted to RGB for display through a webpage.

Figure 7A:
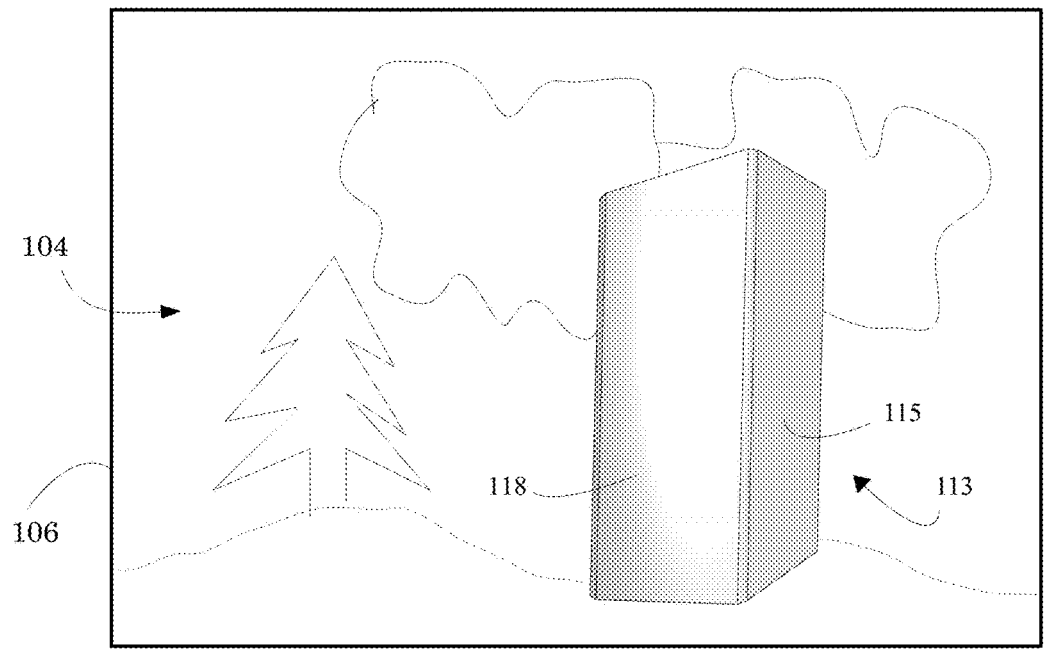
FIGS. 7a-7d illustrate views of graphical user interfaces of a system for visualizing an object as part of a structure in a simulated environment according to the principles of the present invention.
Figure 7B:
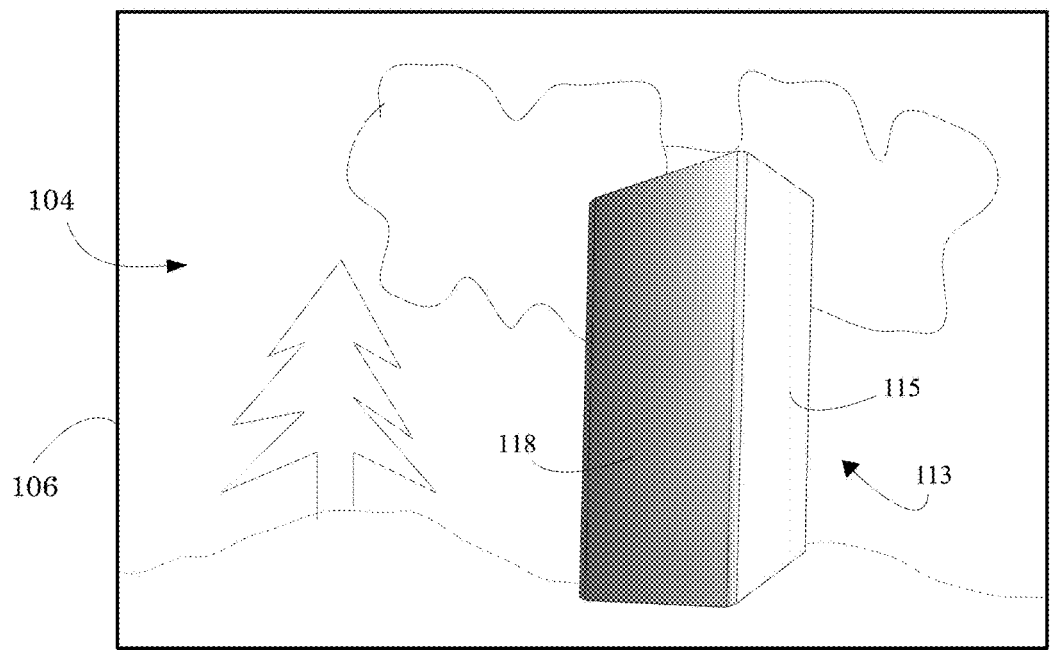

Referring now to FIGS. 7a-7d, shown are GUIs 106 according to a further non-limiting embodiment of the present invention. With reference to FIGS. 7a and 7b, illustrated is a virtual object 112 that includes a structure comprising a front face 118 and a side face 115, in addition to other sides not shown. In this example, the structure is a virtual object 112 comprising one or more glass panes that comprise the front face 118, side face 115, and other faces of the structure. The virtual object 112 is rendered in a simulated environment 104 based on a lighting condition. In the illustrated examples of FIGS. 7a and 7b, the simulated light sources are at different locations with respect to the virtual object 112. The virtual object 112 may also include other building materials that comprise physical properties or are coated with a coating having physical properties. In FIG. 7a, the front face 118 is lighter than the front face 118 in FIG. 7b because the simulated lighting condition is situated toward a left side of the environment and results in the front face 118 reflecting the lighting condition. In FIG. 7b, the simulated lighting condition is toward the right of the simulated environment and results in the side face 115 reflecting the light, and appearing to be lighter, and the front face 118 appearing darker.

Figure 7C:
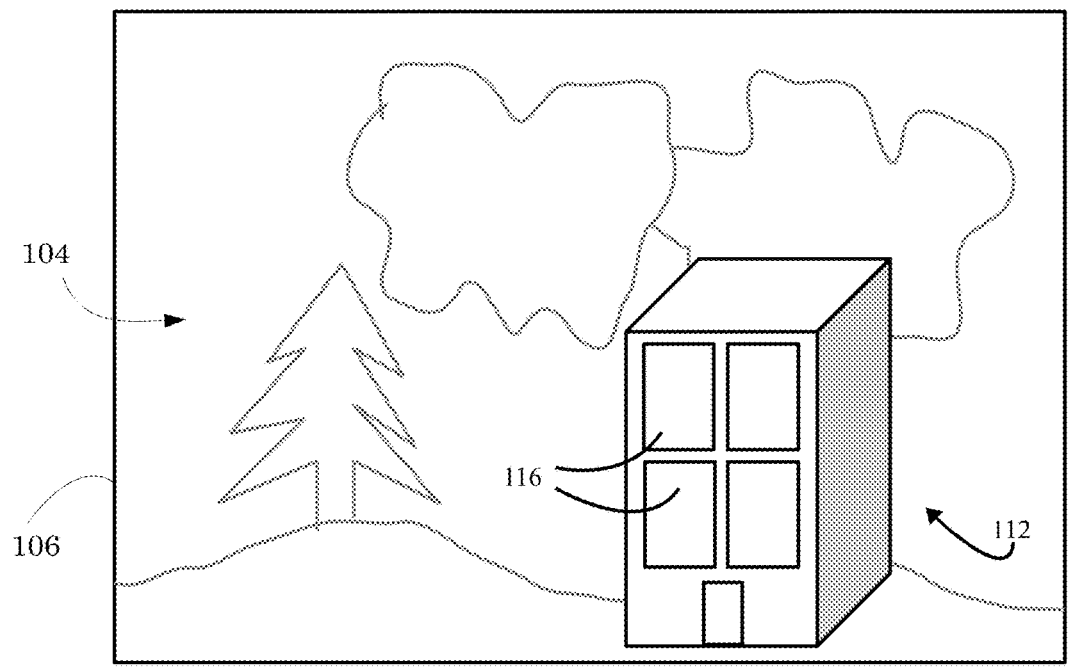
Figure 7D:
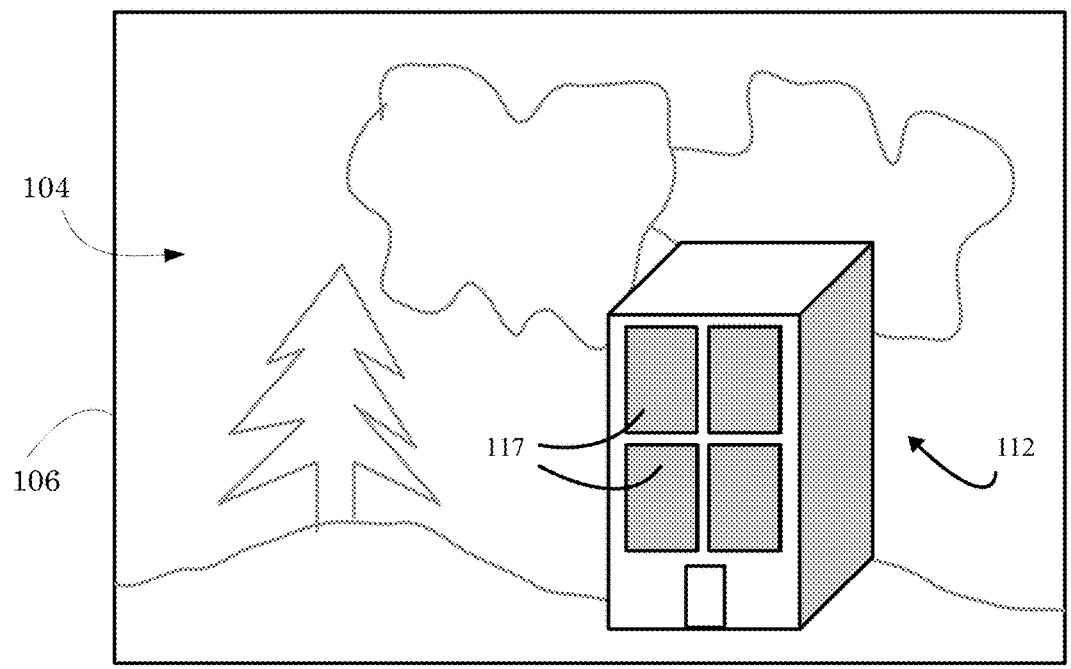

Referring now to FIGS. 7c and 7d, a GUI 106 depicts a virtual object 112 in a simulated environment 104 according to one non-limiting embodiment of the present invention. The virtual object 112 comprises a building having front-facing windows 116, 117 that simulate glass panes having a coating or otherwise having physical properties, including optical properties. In FIGS. 7c and 7d, the front-facing window 116 is one type of glass object and the front-facing window 117 is a second type of glass object. The two windows 116, 117 are associated with different object data and, even at the same angle of incidence to the simulated lighting condition, produce different visual effects. The windows 116 in FIG. 7c include a reflective pane of glass and the windows 117 in FIG. 7d include a less reflective pane of glass that may also be a different color.

In one preferred and non-limiting embodiment, a virtual object 112 comprising a structure may be rotated with respect to the simulated environment 104, or the entire simulated environment 104 may be rotated. In this way, different views of a virtual object 112 (e.g., structure) can be rendered. Additionally, a visualization may be provided from inside a structure looking out of a glass pane. Thus, potential customers of a type of glass can visualize what a building will look like from the exterior in a variety of environmental conditions, and what the environment will look like from inside the building, looking outside the windows. For example, the windows may be highly reflective in one direction, looking at the windows from the exterior, and may be less reflective in the other direction, looking outside.

Figure 9:
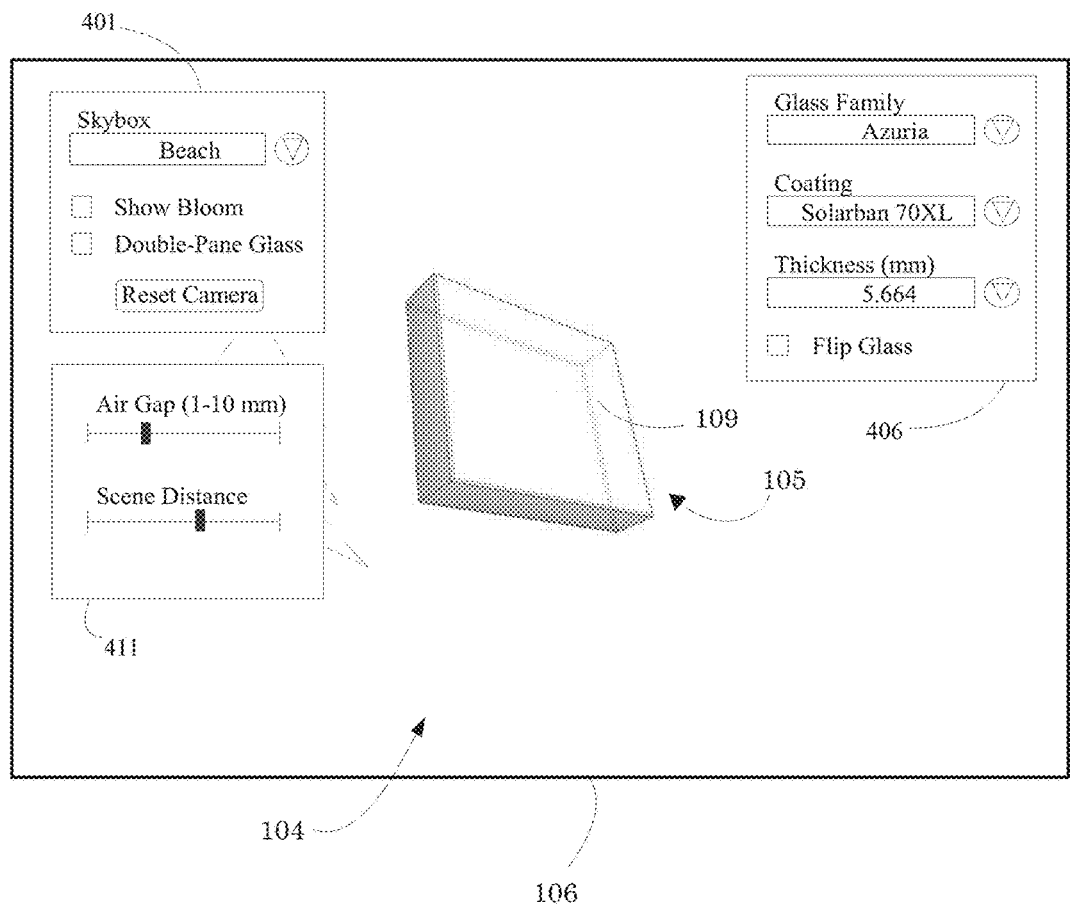
FIG. 9 illustrates a view of a graphical user interface of a system for visualizing a virtual object in a simulated environment according to the principles of the present invention.

With reference to FIG. 9, a user interface with tools is shown according to one preferred and non-limiting embodiment. The GUI 106 displays a simulated environment 104 and a virtual object 105 in that environment. The virtual object 105 has a front-facing side 109 and is rendered based on physical properties associated with that virtual object 105 and the simulated environment 104. The GUI 106 also includes various interfaces comprising tools. An environment selection interface 401 allows for the selection of a simulated environment and other display options relating to the environment. A distance selection interface 411 may be provided to allow for various distances and perspectives to be specified. For example, the distance selection interface 411 may be used to specify the distance between glass panes, in instances where the virtual object comprises more than one pane or a three-dimensional glass box, and/or a distance between the simulated environment 104 and the object for rendering purposes. The GUI 106 may also include an object selection interface 406 that allows users to select different types of glasses, thicknesses, and/or coatings. It will be appreciated that any number of user tools may be provided in or out of the GUI 106, and that the object 105 may comprise any number of materials resulting in different types of tools and options.

Figure 10A:
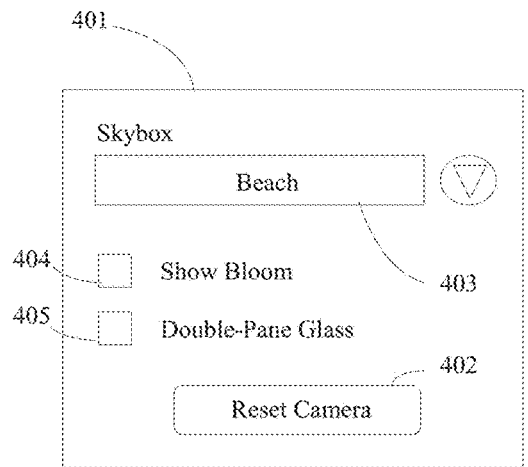
FIGS. 10a-10c illustrate views of graphical user interfaces shown in FIG. 9 in a system for visualizing a virtual object in a simulated environment according to the principles of the present invention.
Figure 10B:
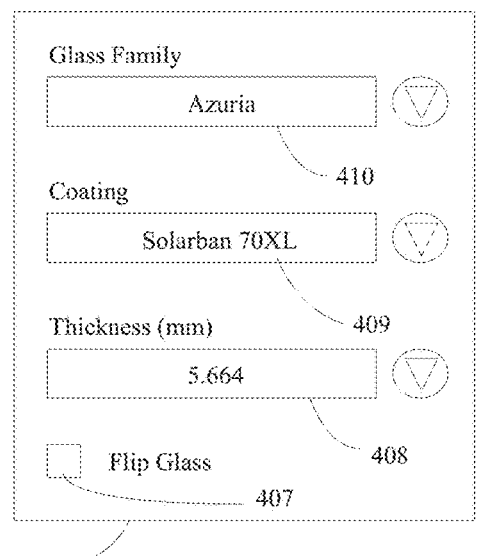
Figure 10C:
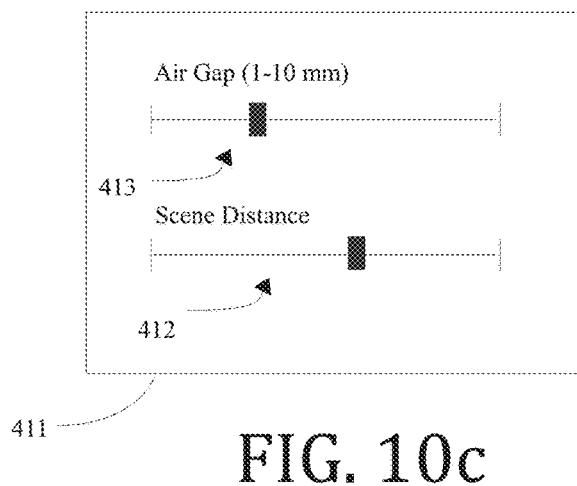

With reference to FIGS. 10a-10c, various user interfaces are shown according to one preferred and non-limiting embodiment. It will be appreciated that the user interfaces 401, 406, 411 may include different types of tools, such as buttons, pull-down menus, option boxes, text input boxes, radio buttons, etc. Referring now to FIG. 10a, an environment selection interface 401 is shown according to one preferred and non-limiting embodiment. The interface includes an environment selection tool 403, a Show Bloom option 404, a Double-Pane Glass option 405, and a Reset Camera 402 button. The environment selection tool 403 allows users to select any number of environments, such as a beach, forest, city, building interior, and environments associated with various times of day.

With continued reference to FIG. 10a, the Show Bloom option 404 may produce a "bloom" effect, as is known in the art of computer graphics, in which feathers or strands of light form around the virtual object 105 to simulate the effect an ordinary camera lens would have. This effect may produce a glow around the virtual object 105 and simulate what the virtual object 105 would appear like in a photograph or video. The Double-Pane Glass option 405, if chosen, may cause the object to comprise two panes of glass, separated by a distance. The use of two panes of glass may affect the optical properties of the virtual object. The Reset Camera button 402 may reset the camera perspective, viewing angle of the object, or other display properties to a default setting, allowing users to reorient themselves with the interface.

Referring now to FIG. 10b, an object selection interface 406 is shown according to one preferred and non-limiting embodiment. The object selection interface 406 includes a Glass Family selection tool 410, a Coating selection tool 409, and a Thickness selection tool 408. In one example, these tools 408, 409, 410 are pull-down menus. The Glass Family selection tool 410 may allow a user to select one or more of several types of objects that the virtual object can comprise. The Coating selection tool 409 may allow a user to select one or more of several types of coatings that are to be applied to the virtual object. The Thickness selection tool 408 may allow a user to select a desired thickness for the virtual object. A Flip Glass selection tool 407 may allow a user to change the viewable angle of the virtual object, such as a 180 degree angle (e.g., a flip). The tools in the object selection interface 406 may change the physical properties of the virtual object or a viewing angle of the virtual object, thus changing the way that the virtual object is visualized.

With reference to FIG. 10c, a distance selection interface 411 is shown according to one preferred and non-limiting embodiment. The distance selection interface 411 may have one or more options to change viewing perspectives or distances associated with the virtual object. For example, a Scene Distance selection tool 412 allows a user to specify the distance between the environment and the virtual object. Although this type of distance may be preset by the system for provided environments and virtual objects of given proportions, selecting the distance may be required for user-supplied environments or objects. Further, the Air Gap selection tool 413 allows a user to specify the spacing in a hollow object, or between two glass panes, that could be filled with air or another type of gas. The Scene Distance selection tool 412 and Air Gap selection tool 413 may be slide-bars or any other type of selection means.

Figure 11:
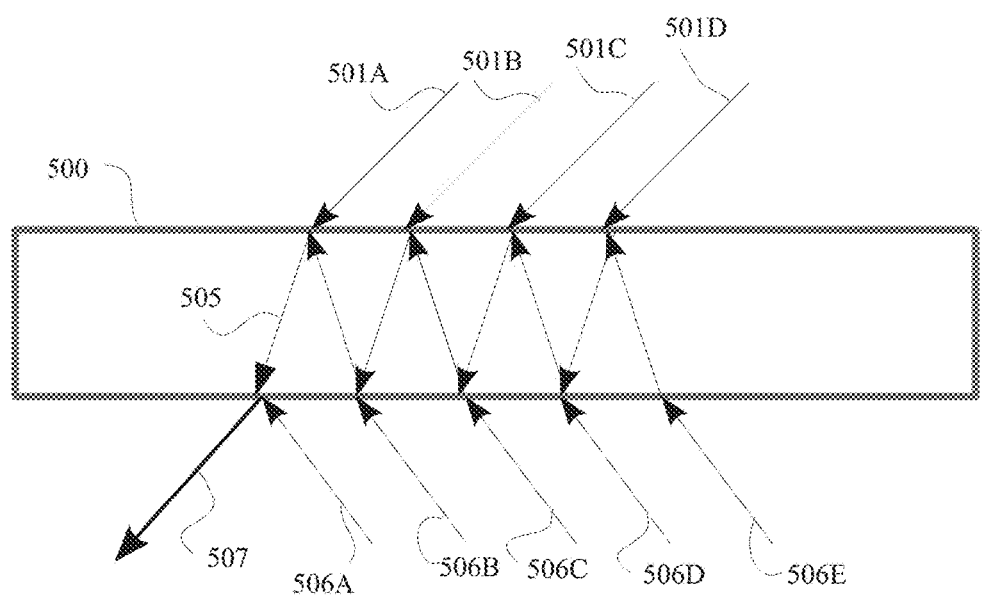
FIG. 11 is a ray diagram illustrating optical properties of a virtual object according to the principles of the present invention.

Referring to FIG. 11, a ray diagram illustrates how light moves through a piece of glass 500 based on transmission and reflection. In one preferred and non-limiting embodiment, the virtual object is rendered to simulate the actual optics of a real piece of glass or other object. Several external rays 506A-E, 501A-D contact the virtual object 500. Although other rays may be incident to each external ray that travels or is reflected off the virtual object 500, FIG. 11 illustrates several rays that, in some form, result in output ray 507. As an example, output ray 507 includes the directly reflected ray of ray 506A, and the ray 505 that traveled through the virtual object 500 according to certain transmission properties, altering external ray 501A. Additionally, some form or portion of external rays 501B-D and 506B-E all end up as part of output ray 507.

Figure 12:
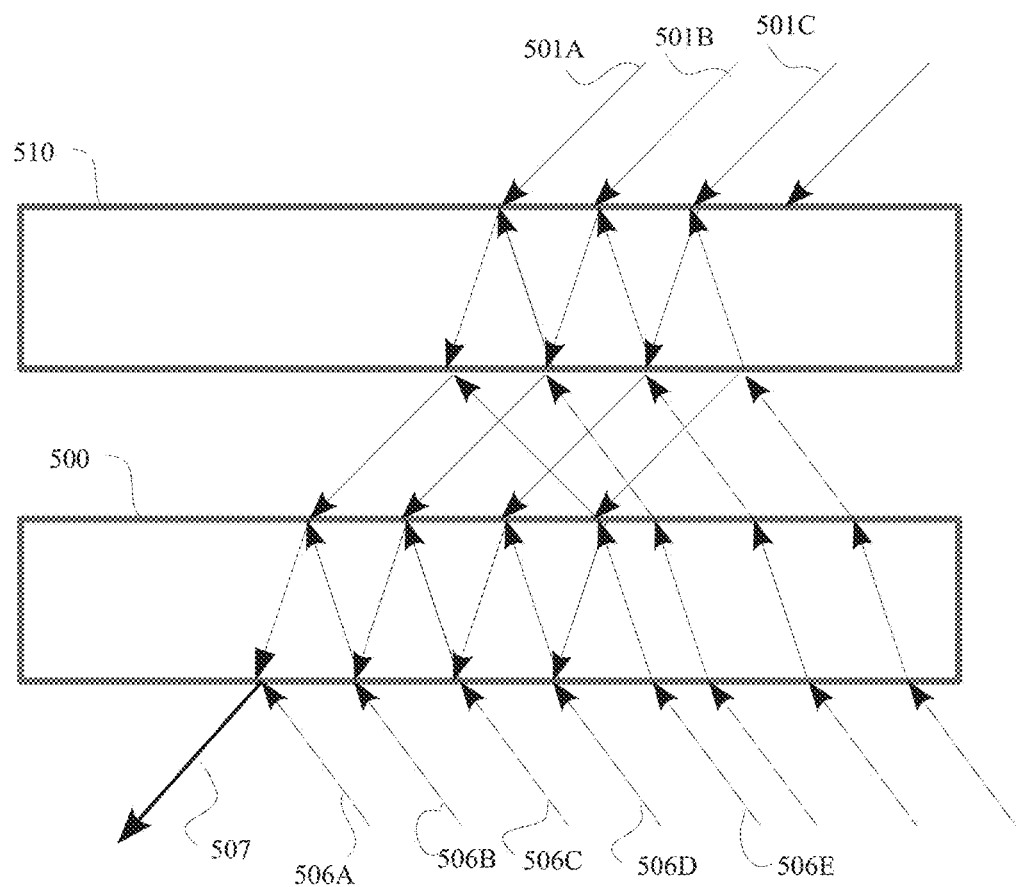
FIG. 12 is a ray diagram illustrating optical properties of a virtual object including two panes of glass according to the principles of the present invention.

Referring to FIG. 12, a ray diagram illustrates how light moves through two pieces of glass 500, 510 based on properties of transmission and reflection. External rays 506A-E contact the virtual object 500 (e.g., first piece of glass) and external rays 501A-C contact the virtual object 510 (e.g., second piece of glass). As illustrated, output ray 507 is a result, to some degree, of all external rays 501A-C and 506A-E, through direct or indirect reflection and transmittance. The space between the pieces of glass also affects the optical properties of the virtual object comprising both pieces of glass.

Figure 13A:
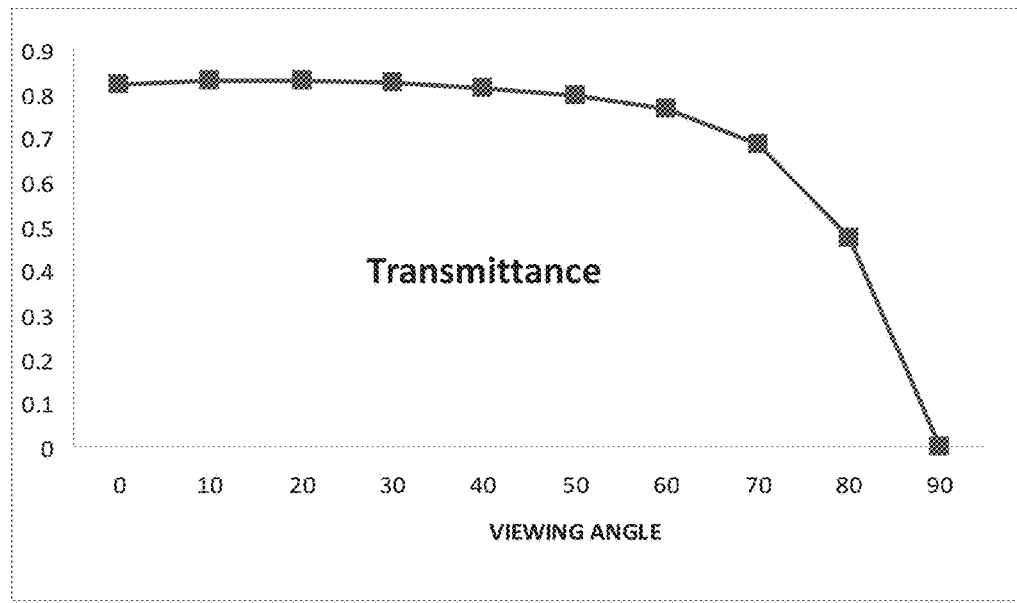
FIGS. 13a-13c are graphs illustrating optical properties of an object at various viewing angles.
Figure 13B:
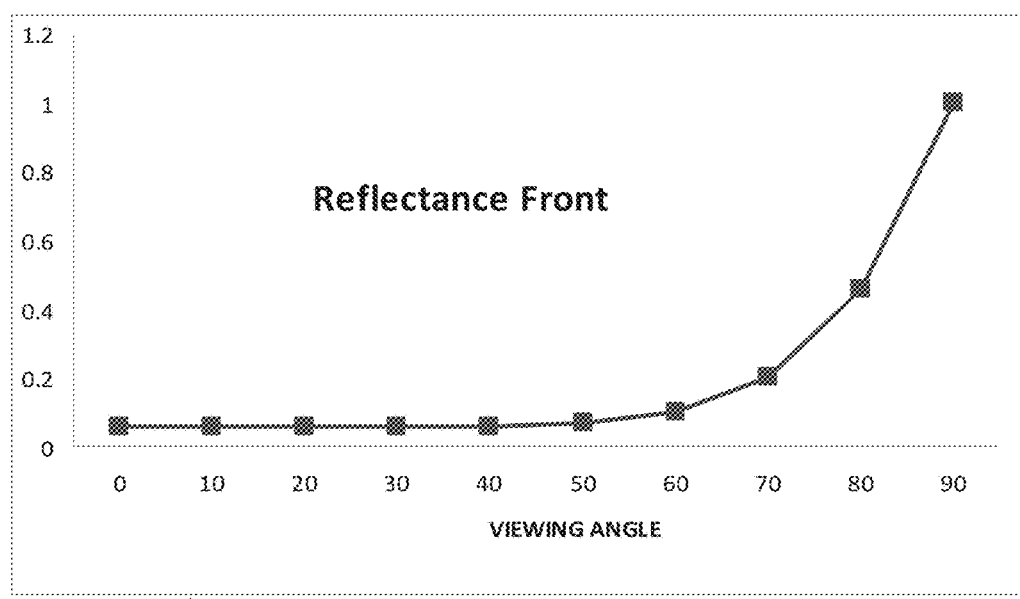
Figures 13C, 14:
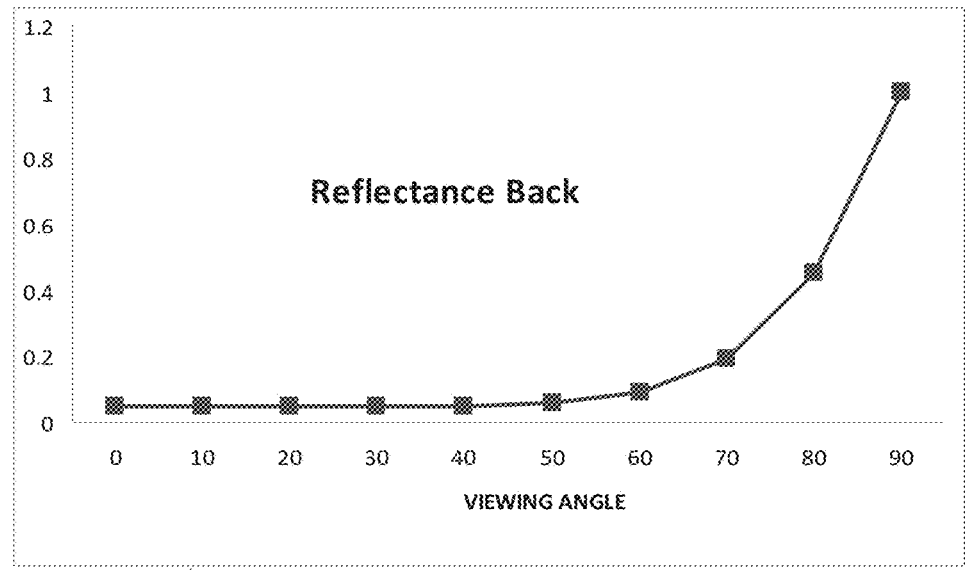
FIG. 14 is a data table representing the graphs shown in FIGS. 13a-13c.

With reference to FIG. 13a-13c, shown are graphs of optical properties calculated for various viewing angles of a particular object in one preferred and non-limiting embodiment of the present invention. With reference to FIG. 13a, the transmittance graph 600 illustrates the relationship between a viewing angle, as an x-axis, and transmittance, as a y-axis. FIG. 13b illustrates a reflectance front graph 601 for a front-facing side of an object (as an example, one side of a piece of glass), and the relationship between viewing angle, as an x-axis, and reflectance, as a y-axis. Similarly, FIG. 13c illustrates a reflectance back graph 603 for a rear-facing side of the object (as an example, a second side of the piece of glass) represented in FIG. 13b.

Referring now to FIG. 14, shown is a data table 604 for a particular type of object, showing calculated transmittance and reflectance values compared to values retrieved from the LBL database. This particular data table 604 relates to a SolarBan60 clear coating, and shows values for transmittance (Tvis), reflectance from front (RFVis), and reflectance from back (RBVis). As can be seen, the calculated visualizer values closely approximate the LBL values.

Figure 8A:
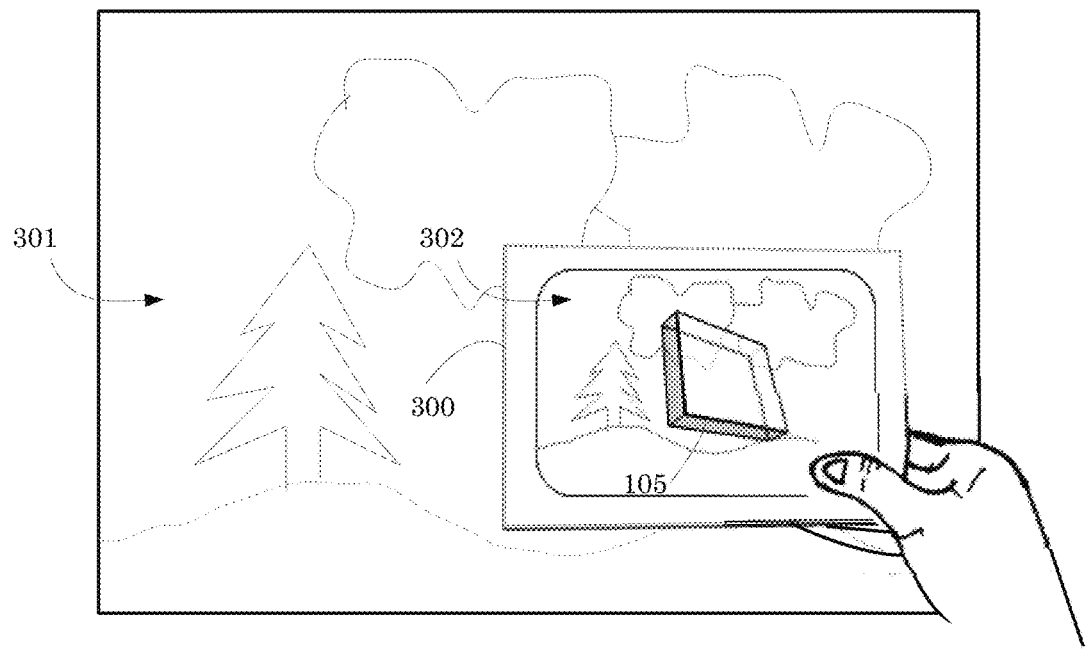
FIGS. 8a-8b illustrate views of mobile devices in an environment according to the principles of the present invention.
Figure 8B:
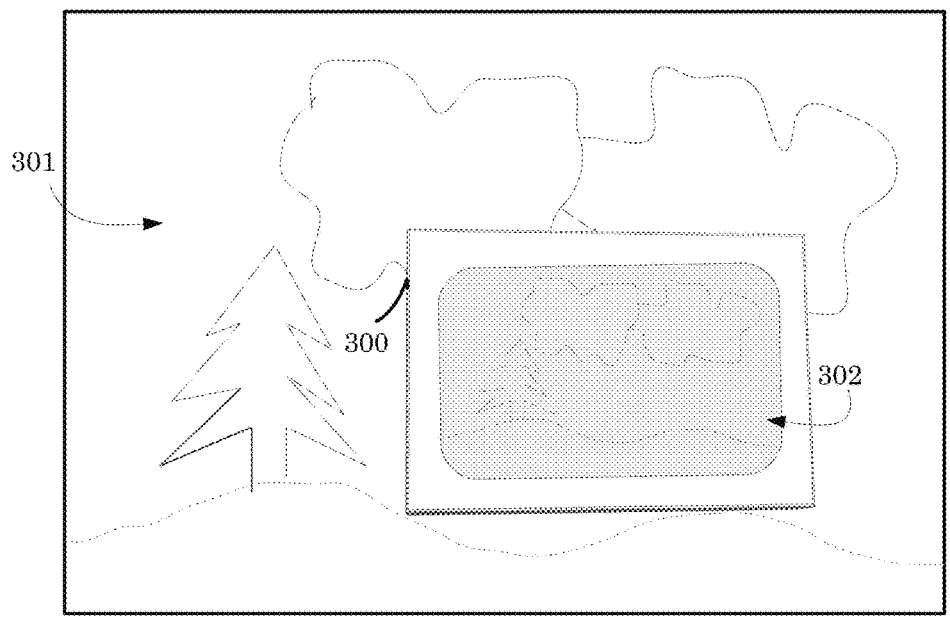

Referring now to FIGS. 8a and 8b, augmented reality applications are illustrated according to preferred and non-limiting embodiments of the present invention. In FIG. 8a, illustrated is an actual environment 301, a mobile device 300 being held in that actual environment 301, a visual representation of the actual environment 302 on a display of the mobile device 300, and a rendering of a virtual object 105 in that visual representation of the actual environment 302. One or more cameras or other input devices on the mobile device 300 capture the actual environment 301 as a video feed or still image that is displayed by the device 300. In this manner, a user is able to view how various objects appear in that actual environment 301. As explained herein, various tools may allow the user to manipulate the virtual object 105. The mobile device may include, for example, a smartphone, a tablet computer, a laptop computer, or any other mobile/portable computing device having a camera, or other input means, and a display device.

It will be further appreciated that, in addition to rendering a virtual object in the augmented reality application, coatings or other materials with optical properties may be virtually displayed on various actual surfaces and/or objects present in the actual environment 301. For example, standing in front of a glass building and viewing the building through the mobile device, a visual rendering of that building could be displayed that simulates a specified coating on the exterior sides. In another example, a user could use the augmented reality application to virtually paint various walls of a room with different colors.

Referring now to FIG. 8b, one preferred and non-limiting embodiment of an augmented reality system is shown. In this example, the mobile device 300 mimics a pane of glass using one or more cameras coupled to the device. In this embodiment of the augmented reality system, a user is shown a rendering 302 of how an actual environment 301 appears through a glass object having one or more specified physical properties. Viewing options may include the ability to change the direction (e.g., flip the glass) and view the actual environment 301 as though a user were looking outside or inside a window having such a coating. Moreover, it will be appreciated that back- and front-facing cameras may be used to realistically convey optical properties. For example, a front-facing camera may be used to obtain image data to be reflected and transmitted, including luminosity. Various configurations of hardware and software may be used to implement the augmented reality systems.

In one preferred and non-limiting embodiment, a glass performance hub may be provided to allow users to compare the properties of different glass and coating products. The glass performance hub may, for example, provide energy analysis, thermal stress data, and wind load information for different types of glass or glass-like building materials. The hub may allow users to compare different glass or coating types based on performance and/or aesthetics. The hub may further allow a user to incorporate selected glass types or coating types on images of buildings or other structures, to simulate how that glass or coating would appear in the illustrated environment. The hub may have search options for users to locate different glass and/or coating products, and may sort or filter results based on desired performance characteristics, categories, etc. Glass and coating types may be compared by, for example, SHGC values, U-values, reflectance, transmittance, etc.

Figure 15:
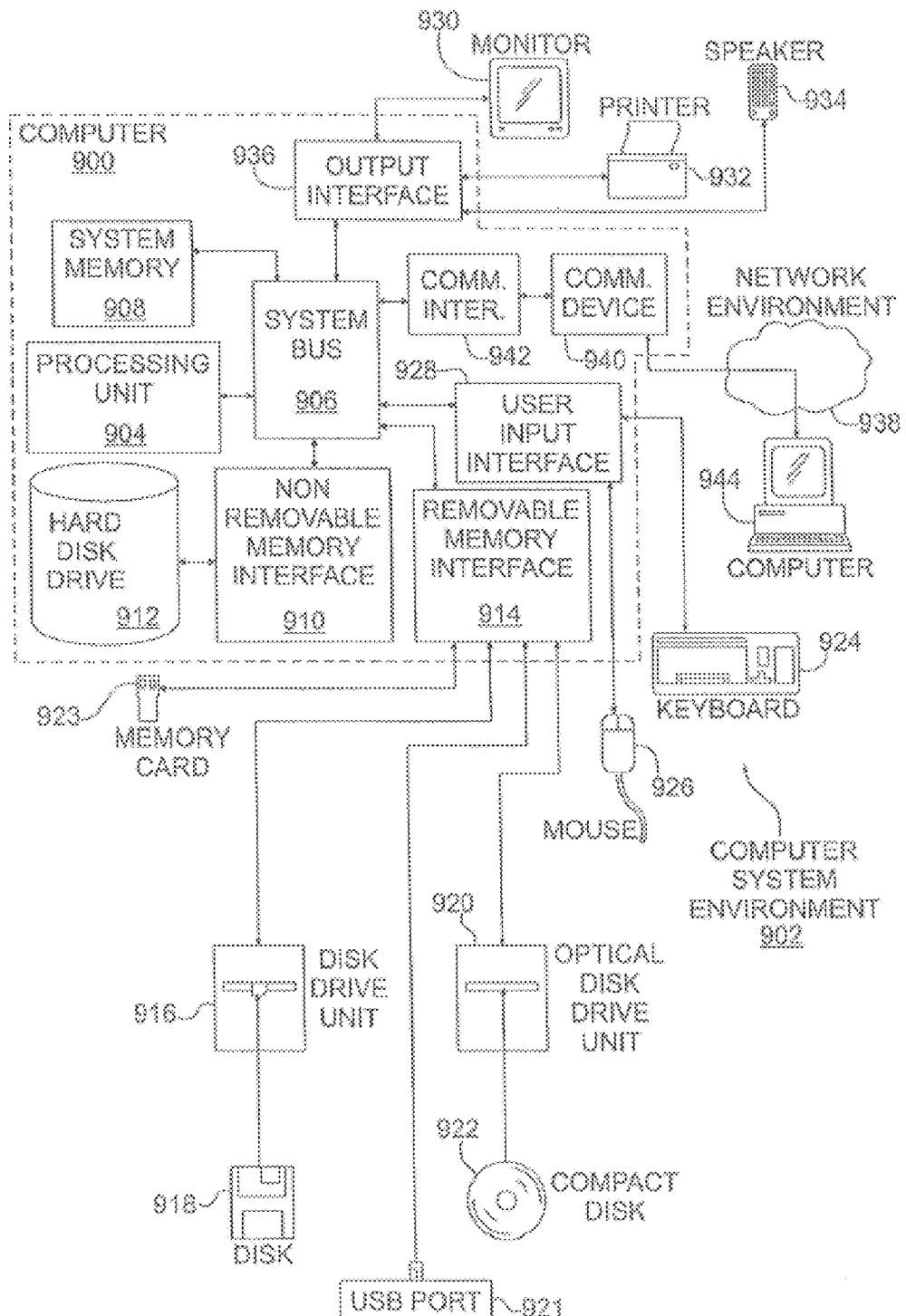
FIG. 15 is a block diagram of a computing system environment according to the prior art.

The present invention may be implemented on a variety of computing devices and systems, wherein these computing devices include the appropriate processing mechanisms and computer-readable media for storing and executing computer-readable instructions, such as programming instructions, code, and the like. As shown in FIG. 15, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 15, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 15 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 904 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for visualizing a selected glass object on a mobile device having a display screen, comprising:
 receiving user input identifying a selected glass object, wherein the selected glass object is selected from a plurality of glass objects, and wherein each glass object of the plurality of glass objects is associated with object characteristics;
 capturing visual data from at least one camera coupled to the mobile device, the visual data comprising environment data corresponding to an actual environment;
 rendering, with at least one processor, the visual data received from the at least one camera on the display screen of the mobile device based at least partially on the object characteristics of the selected glass object and the visual data, such that the display screen shows a rendering of how the actual environment appears through the selected glass object.

2. The computer-implemented method of claim 1, wherein the object characteristics comprise at least two of the following: reflectance, transmittance, attenuation, color, thickness, or any combination thereof.

3. The computer-implemented method of claim 1, further comprising continually re-rendering the visual data as a user modifies a viewing angle of the mobile device.

4. The computer-implemented method of claim 1, wherein the object characteristics comprise at least one of the following: object type, object property, object composition, object shape, object size, or any combination thereof.

5. The computer-implemented method of claim 1, wherein the environment data comprises a lighting condition having a luminosity, and wherein the visual data is rendered based at least partially on the luminosity.

6. The computer-implemented method of claim 1, wherein the plurality of glass objects comprises panes of glass having different object characteristics.

7. The computer-implemented method of claim 6, wherein the selected glass object comprises two panes of glass.

8. The computer-implemented method of claim 1, wherein the at least one camera comprises a front-facing camera and a back-facing camera, and wherein the visual data is captured from both the front-facing camera and the back-facing camera.

9. The computer-implemented method of claim 1, wherein the selected glass object has two sides, and wherein the visual data is rendered based at least partially on at least one object characteristic associated with a first side of the glass object, the method further comprising re-rendering, with at least one processor, the visual data based at least partially on at least one object characteristic associated with a second side of the glass object in response to user input.

10. A computer program product for visualizing a selected glass object on a mobile device having a display screen, comprising at least one non-transitory computer-readable medium including program instructions that, when executed by at least one processor, cause the at least one processor to:

receive user input identifying a selected simulated environment and a selected glass object, wherein the selected glass object is selected from a plurality of glass objects, and wherein each glass object of the plurality of glass objects is associated with object characteristics;

capture visual data from at least one camera coupled to the mobile device, the visual data comprising environment data corresponding to an actual environment; and render the visual data received from the at least one camera on the display screen of the mobile device based at least partially on the object characteristics of the selected glass object and the visual data, such that the display screen shows a rendering of how the actual environment appears through the selected glass object.

11. The computer program product of claim 10, wherein the object characteristics comprise at least two of the following: reflectance, transmittance, attenuation, color, thickness, or any combination thereof.

12. The computer program product of claim 10, further comprising continually re-rendering the visual data as a user modifies a viewing angle of the mobile device.

13. The computer program product of claim 10, wherein the object characteristics comprise at least one of the following: object type, object property, object composition, object shape, object size, or any combination thereof.

14. The computer program product of claim 10, wherein the environment data comprises a lighting condition having a luminosity, and wherein the visual data is rendered based at least partially on the luminosity.

15. The computer program product of claim 10, wherein the plurality of glass objects comprises panes of glass having different object characteristics.

16. The computer program product of claim 15, wherein the selected glass object comprises two panes of glass.

17. The computer program product of claim 10, wherein the at least one camera comprises a front-facing camera and a back-facing camera, and wherein the visual data is captured from both the front-facing camera and the back-facing camera.

18. A mobile device for visualizing a selected glass object, comprising:

at least one camera;

at least one display screen; and at least one processor coupled with the at least one camera and the at least one display screen, the at least one processor programmed or configured to:

receive user input identifying a selected glass object, wherein the selected glass object is selected from a plurality of glass objects, and wherein each glass object of the plurality of glass objects is associated with object characteristics;

capture visual data from the at least one camera, the visual data comprising environment data corresponding to an actual environment; and render the visual data received from the at least one camera on the display screen based at least partially on the object characteristics of the selected glass object and the visual data, such that the display screen shows a rendering of how the actual environment appears through the selected glass object.

19. The mobile device of claim 18, wherein the at least one camera comprises a front-facing camera and a back-facing camera, and wherein the visual data is captured from both the front-facing camera and the back-facing camera.

* * * * *